United States Patent [19]

Reed

[11] 4,248,275
[45] Feb. 3, 1981

[54] METHOD FOR OBTAINING UNIFORMLY MIXED GASES IN A BALL MOLD

[75] Inventor: Thomas F. Reed, Akron, Ohio

[73] Assignee: The General Tire & Rubber Company, Akron, Ohio

[21] Appl. No.: 10,767

[22] Filed: Feb. 9, 1979

Related U.S. Application Data

[63] Continuation-in-part of Ser. No. 871,065, Jan. 20, 1978, Pat. No. 4,166,484, and Ser. No. 821,002, Aug. 1, 1977, said Ser. No. 60,316.

[51] Int. Cl.³ .............................................. B65B 31/02
[52] U.S. Cl. .......................................... 141/4; 53/408; 53/86; 264/545; 264/574
[58] Field of Search .................... 264/83, 85, 571, 574, 264/545; 273/61 R, 61 D; 141/1, 4, 5, 8, 9, 11, 51, 65, 66, 63, 114, 324, 392; 53/403, 408, 86

[56]  References Cited

FOREIGN PATENT DOCUMENTS 2028096 12/1971 Fed. Rep. of Germany .............. 141/5
738777 12/1973 South Africa .

Primary Examiner—Frederick R. Schmidt

[57]  ABSTRACT

A method is provided for rapidly distributing mixed gases throughout a partially evacuated ball mold. The invention is particularly useful in the pressurizing of tennis ball centers with a mixture of air and a low permeability gas. By this invention, the distribution of the low permeability gas throughout the mold can be accomplished by first partially evacuating air from the mold then injecting the mixed gases into the mold.

5 Claims, 3 Drawing Figures

METHOD FOR OBTAINING UNIFORMLY MIXED GASES IN A BALL MOLD

CROSS-REFERENCE TO RELATED APPLICATIONS

This application is a continuation-in-part of U.S. application Ser. No. 871,065, Reed, filed Jan. 20, 1978, now U.S. Pat. No. 4,166,484 issued Sept. 4, 1979 and U.S. application Ser. No. 821,002, Reed et al, filed Aug. 1, 1977 now application Ser. No. 060,316 filed July 25, 1979. There was a rumor to the effect that some other party has attempted to evacuate a tennis ball mold and repressurize with $SF_6$ and air, unsuccessfully as is set forth in application Ser. No. 871,065. The rumor was heard after the filing of application Ser. No. 871,065. This invention also relates to U.S. Pat. No. 4,098,504, Reed et al, issued July 4, 1978. The foregoing applications and this application, as well, are assigned to The General Tire & Rubber Company.

The related applications disclose the $SF_6$ or other low permeability gases to achieve longer life in pressurized tennis balls. In work done in development of the inventions disclosed in the related applications, it has also been found that, because of the high densities of these gases relative to air, they do not readily mix with air during the pressurization of tennis centers. The use of mechanical mixing with a pumping loop external to the second-cure mold was found to provide a satisfactory mixture in a reasonable time. The problem with external mixing, however, is that the pumping equipment required to perform this in a large factory operation is difficult to find and maintain. Furthermore, leaks in the press seals during the pumping cycle cause undesirably large inter-press variance in gas composition.

FIELD OF THE INVENTION

The present invention relates generally to the depresurizing and injection of mixed gases into a closed chamber, and more particularly to the depressurizing and injection of a uniform mixture of a low permeability gas with air into a tennis ball center or racquetball just prior to the joining of two halves of the ball together to form a complete pressurized ball.

DESCRIPTION OF THE PRIOR ART

Patent application No. 73/8777, Republic of South Africa, discloses pressurizing a game ball with perfluoropropane to aid in pressure retention.

German Offenlegungsschrift No. 2,028,096 is directed to oxygen scavenging from a container before introducing a liquid, using sulfur hexafluoride. An oxygen-free method of filling liquids into vessels or bottles using an inert protective gas is carried out by displacing the air contained in the vessels by sulfur hexafluoride and maintaining a protective atmosphere of the same until filling is completed. The protective atmosphere is maintained until the vessel is sealed. The vessel cap and the part of the opening covered by it may also be scavenged with sulfur hexafluoride before closure. The gas may be introduced in liquid or solid form into the vessels and evaporated to expel the air. The sulfur hexafluoride may be utilized in a closed circuit, the air removed by it being separated by liquefying or crystallizing the sulfur hexafluoride.

SUMMARY OF THE INVENTION

According to the method of the subject invention, the foregoing problems in distributing uniform gas mixture throughout a ball mold are solved by first evacuating some of the air trapped in the mold through a port in the mold, then a mixture of air and a second gas are pumped into the mold through a port. The pressure in the mold cavity after evacuation should be from 15 to 35 kPa absolute and preferably from 15 to 25 kPa absolute. The degree of vacuum caused by withdrawing the air should not be so great so as to cause the ball halves positioned in the mold cavities to pop out, but should be great enough to ensure a fairly uniform mix of air and the second gas. The second gas has a permeability through the ball wall of from 1% to 90% of that of air and is present at a level of from 10 to 92 mole percent of the total of the gas mixture. The second gas preferably has a permeability through the ball wall of from 1 to 50% of that of air and is preferably present at a level of 50 to 75% on a mole basis of the total gas mixture. The second gas preferably is selected from the class consisting of sulfur hexafluoride ($SF_6$), perfluoromethane ($CF_4$), perfluoroethane ($C_2F_6$), perfluoropropane ($C_3F_8$), chloropentafluoroethane ($C_2ClF_5$) and perfluorocyclobutane ($C_4F_8$).

According to the apparatus of the subject invention, a conduit is provided communicating at one end with a first port in the mold for injecting the gas mixture into the mold. A second conduit is provided communicating at its other end with the same or a second port in the mold for evacuating the mold.

Both the method and apparatus of this invention are particularly applicable to the mixing of a low permeability gas such as sulfur hexafluoride with air and injecting the mix into a mold designed for pressurizing ball centers and joining together the halves of these centers after such pressurization.

The foregoing features and objects of this invention will be more apparent from the following detailed description and the attached drawings.

DESCRIPTION OF THE PREFERRED EMBODIMENTS

Figure 1:
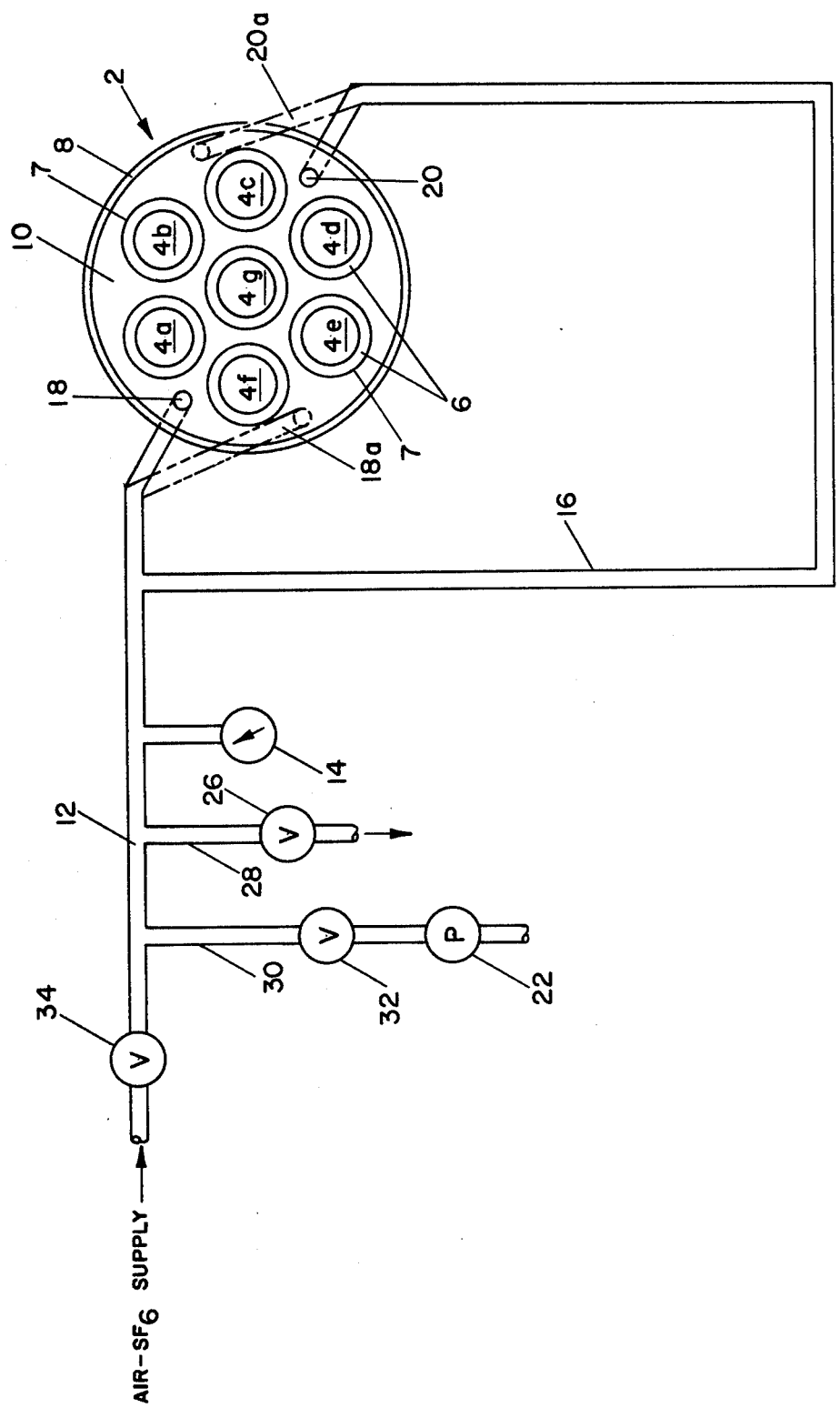
FIG. 1 is a diagrammatic view of an apparatus for pressurizing tennis ball centers, illustrating the subject invention.
Figure 2:
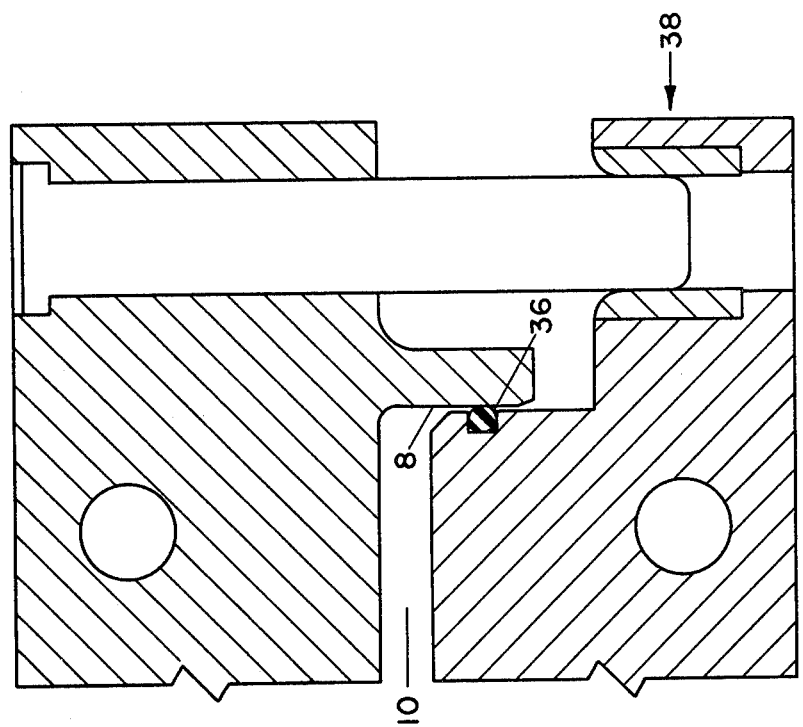
FIG. 2 is a side view of a partial section of the mold.

Referring to the diagrammatic representation of the apparatus in FIGS. 1 and 2, the bottom side of a top mold half 2 is shown with mold cavities 4, labelled individually 4a, 4b, 4c, 4d, 4e, 4f and 4g. Top tennis ball center halves 7 having adhesive coated edges 6 are lodged in these mold cavities 4. Around the periphery of the top mold section 2 is a sealing element 8 that engages a sealing element 36 on the outer periphery of the bottom mold section 38.

The bottom mold half 38 shown in partial section in FIG. 2, is similar to the top mold half 2 and has bottom tennis ball halves (not shown) that are lodged in cavities directly beneath the cavities 4 in the top mold section 2. As is conventional in molding apparatus for joining tennis ball halves together, the top mold section 2 initially engages the bottom mold section with its peripheral sealing element 8 to form a chamber 10 while the edges of the ball halves within the mold cavities of both mold sections are left spaced from each other a small distance. In other words, the circular edges of the ball halves are near to but not engaging each other, while the peripheral edges of the mold sections engage each other to form the chamber 10 that is sealed so that it can be pressurized. The foregoing features of the apparatus of FIG. 1 are conventional and are found in most molds that are designed for pressurizing the space within tennis ball halves and then joining these halves together to form a complete pressurized ball.

The chamber 10 is designed to be pressurized with air through a means such as conduit 12 that is shown in FIG. 1 communicating with the chamber 10 through a portion of another conduit 16. In order to reduce the loss of air pressure in the tennis balls after they are formed, however, it is desirable to replace in part the air introduced through the conduit 12 with sulfur hexafluoride ($SF_6$), or alternatively perfluoromethane ($CF_4$), perfluoroethane ($C_2F_6$), perfluoropropane ($C_3F_8$), chloropentafluoroethane ($C_2ClF_5$) and perfluorocyclobutane ($C_4F_8$), or another non-toxic gas having a permeability between 1 and 90% and preferably 1 to 50% of that of air through the walls of tennis ball halves 7. This low permeability gas is pumped into the chamber 10 to the desired pressure level as indicated on pressure gauge 14. For example, a desired pressure for a mixture of $SF_6$ gas and air would be about 100 kPa gauge so that the concentration of $SF_6$ within the chamber 10 would be approximately 50% by volume.

The problem which is solved by this invention is that the air and $SF_6$ or other low permeability gas do not mix very rapidly by diffusion. Thus, if the tennis ball center halves were joined together without allowing the necessary time for diffusive mixing and without employing some kind of mechanical mixing, the concentration of low permeability gas would be very high in the tennis balls in the mold near where the gas is introduced to the mold, and it would be very low in the tennis balls distant from this location. Only some of the balls would have the longlife advantages provided by pressurizing the balls with the low permeability gas.

To solve this problem, a vacuum pump 22 or other vacuum source is provided. Through the conduits 12 and 16 the air in chamber 10 is withdrawn through ports 18 and 20 in the top (and/or bottom) mold section 2 (and/or 38) and is pumped by a pump 22 back into the atmosphere.

In large molds, the removal of the air in chamber 10 may be enhanced by providing ports 18a and 20a on the conduits 12 and 16 so that the air is withdrawn from chamber 10 through a plurality of ports and mixed gases are pumped back into the chamber 10 through a plurality of ports. The mold actually used only had one port but a larger number of ports are preferred in larger molds as they speed up evaluation and pressurization and, thus, reduce gas leakage past the sealing ring 36. In operation, air is removed from the chamber 10 with valve 32 open and valves 26 and 34 closed. When the desired vacuum is reached as indicated by gauge 14, valve 32 in conduit 30 is closed and valve 34 in conduit 12 is opened. Then air-$SF_6$ mixture under pressure is injected into chamber 10 through ports 18, 20, 18a and 20a. The low permeability gas thus becomes rapidly distributed throughout the chamber 10. After the mold is pressurized to about 100 kPa, valve 34 is turned off again. The mold sections are then immediately closed to join together the tennis ball halves, and the gas trapped within the chamber 10 but outside the joined tennis ball halves is vented by opening valve 26 in vent line 28.

Figure 3:
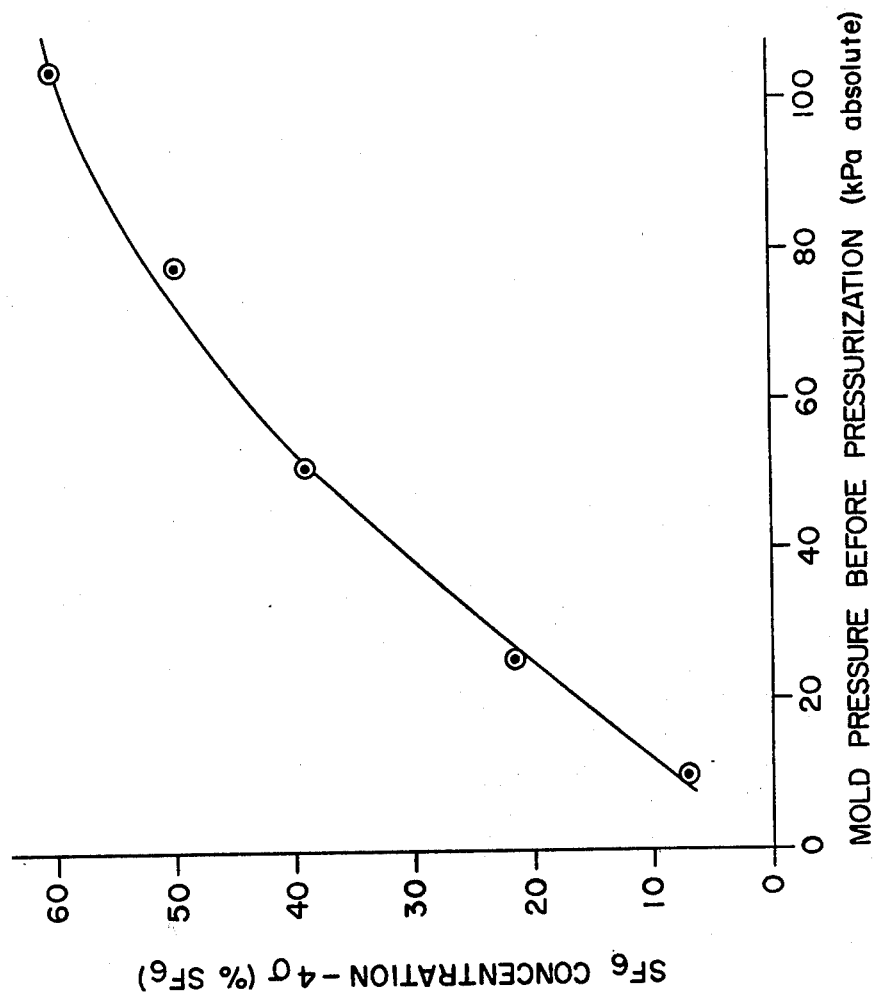
FIG. 3 correlates $SF_6$ concentration deviation with mold depressurization.

The utility of the foregoing method and apparatus for distributing the low permeability gas throughout the chamber 10 has been demonstrated by means of standard deviation analysis of the variations in concentrations of sulfur hexafluoride among the tennis ball centers produced by the apparatus and method described above. The results of these tests and analyses are shown in FIG. 3 of the attached drawings.

In any mixture of 50% by volume sulfur hexafluoride and 50% by volume air, there is bound to be some variation in the exact concentration of sulfur hexafluoride in different parts of the mold chamber. For statistical purposes, this variation can be defined by the familiar standard deviation $\rho$, which is determined by the following formula:

$$\sigma = \sqrt{\frac{\Sigma(x_i)^2 - (\Sigma x_i)^2/n}{n-1}}$$

wherein
  $x_i$ = the concentration of sulfur hexafluoride in each sample made at one time in chamber 10 (FIG. 1)
and
  n = the number of samples taken The standard deviation is a numerical measure of the distribution of sulfur hexafluoride concentrations around the average value of sulfur hexafluoride concentrations for each collection of samples. If the distribution is wide and spreads over a large area on either side of the value for average concentration, then $\rho$ is large. Conversely, narrow distributions of sulfur hexafluoride concentrations yield correspondingly low values of $\rho$ which indicate that the concentrations of most of the samples fall close to the average concentration.

For a Gaussian-shaped curve, to which many distributions are very similar, a spread of concentrations equal to 4 $\rho$ is enough to include about 95% of the samples. With tennis balls filled with sulfur hexafluoride, it has been estimated that a 20% range of sulfur hexafluoride in 95% of these tennis balls can be tolerated.

Premixing of the low permeability gas and air prior to pressurization of the mold was employed. The necessary degree of mixing can be achieved in an auxiliary tank where there is sufficient time for diffusive mixing or the mixture can be agitated or the two gases can be metered and mixed as they are charged into the mold. Ideally, completely uniform gas compositions would be achieved in the balls if the mold were totally evacuated before pressurization; i.e., there would be no residual gas in the mold to mix with the uniform air/low permeability gas mixture entering the mold during pressurization. An attempt to do that was not successful because the vacuum in the mold caused some of the tennis halves to come out of the cavities and tough each other before the press closed. In production, premature touching can cause premature sticking of the cemented surfaces which can cause faulty balls.

With the foregoing goal in mind, tests were performed. During the pressurizations set forth below, the mold halves were held with their platens 5.6 mm apart, but with their outer peripheries in sealing engagement with one another.

It was found that it is not necessary to totally evacuate the mold to get a reasonably low variance in gas composition. A range of approximately 20% $SF_6$ (i.e., four times the standard deviation) is achieved by evacuating the mold to 25 kPa absolute before pressurizing with a gas mixture. All the ball halves stayed in the mold cavities at this pressure. Further, in two other loads of 7 balls each, only one slight contact was noted by evacuating the mold to 16 kPa absolute and that contact apparently was due to improper positioning of one of the halves. The 4 $\rho$ concentration range at this pressure was even lower (approximately 16%) which is within the estimated desirable range for satisfactory balls.

The experiments were conducted in the seven-cavity mold described previously. Pressurization of the mold for Run A was from a commercial cylinder of $SF_6$ at ambient temperature (purity stated as 99.8+% $SF_6$) and from a 700 $cm^3$ cylinder which had been previously charged with a mixture of air and $SF_6$ for Runs B, C, D and E.

Mixtures were made by pressurizing the cylinder first with air and then with $SF_6$ as shown below.

| B21-6 | Air Pressure (kPa gauge) | $SF_6$ Added to Give Total Pressure (kPa gauge) | $SF_6$ Concentration (%) Theory | $SF_6$ Concentration (%) Actual |
|---|---|---|---|---|
| A | — | — | 100.0 | — |
| B | 1.6 | 414 | 80.0 | — |
| C | 70.3 | 414 | 66.6 | 68.7 |
| D | 119.3 | 414 | 57.1 | 60.8 |
| E | 142.8 | 414 | 52.6 | 53.0 |

The need for different gas compositions in the cylinder was to compensate for the air remaining in the mold. The cylinder was laid on its side and given at least 90 minutes to mix the gases before using it to pressurize the mold.

Tennis halves from production were buffed and cemented with an adhesive made according to the production formulation. The halves were placed in the mold and the mold was sealed but not closed completely. This allows the pressurizing gas to enter the ball cavities before subsequently joining them. If a vacuum were applied, it was left on ten seconds before introducing the pressurization gas. The centers were pressurized to 103 kPa gauge and the press was closed quickly to prevent as little mixing of the gas in the mold as possible. After heating to effect vulcanization of the adhesive, the balls were cooled in the sealed mold, removed, and tested immediately. Both internal pressure and gas composition were measured. The results are below; the ranges in gas composition (i.e., 4 $\rho$) are also given in FIG. 3 (7 centers per test).

| B21-6 | Initial Pressure in Mold (kPa-abs) | Ball Pressure (kPa-gauge) Avg. | Ball Pressure (kPa-gauge) Std. Dev. | $SF_6$ Concentration (%) Avg. | $SF_6$ Concentration (%) Std. Dev. | 4 $\sigma$ |
|---|---|---|---|---|---|---|
| A | 101 | 110 | 0.97 | 46.0 | 15.0 | 60.1 |
| B | 76 | 110 | 1.34 | 51.8 | 12.5 | 49.8 |
| C | 50 | 106 | 2.35 | 53.0 | 9.6 | 38.8 |
| D | 25 | 104 | 2.80 | 48.4 | 5.2 | 20.7 |
| E | 10 | 110 | 0.78 | 52.5 | 1.6 | 6.5 |

The tendency for halves to fall out of the mold cavities because of the vacuum was also assessed. Instead of cementing the halves as above, those in the lower mold platen were coated on their edges with a paste of 25% blue pigment in plasticizer. Nothing was used on halves placed in the upper platen. The mold was sealed but not closed. It was then evacuated and pressurized (with air) according to the same schedule as used above. Afterwards, the mold was opened and the edges of the halves in the top platen were examined for blue contamination.

None of the halves treated like B21-6 A through D have showed any evidence of transfer of blue pigment. Three of the seven halves treated like B21-6 E showed the blue contamination; these were estimated as a trace, 25% and 75% of the edge. The experiment was repeated twice more using 16 kPa initial pressure (between D and E). In the first test, one sample (of the 7 tested) showed a 5% contact area which seemed to be from poor positioning of one tennis half; the rerun showed no transfer of pigment at all.

This work demonstrates that external mixing of air and a low permeability gas ($SF_6$ used here) is a viable method of achieving adequate mixing. The mold is preferably partially evacuated to 16-25 kPa absolute pressure before introducing the gas mixture. This pressure level is a compromise in which the halves remain in the mold cavities and the interball variance seems to be acceptably low.

While the foregoing method and apparatus represent one embodiment of this invention, modifications and other embodiments will, of course, be apparent to those skilled in the art without departing from the scope of the following claims. In the claims, as elsewhere in the specification, percentages of gas mixtures refer to mole percentages.

I claim:

1. A method of rapidly pressurizing a ball mold chamber with a mixture of air and a second gas while the chamber is sealed from the atmosphere, said chamber being defined by the sections of a mold for joining together ball halves and by a plurality of said ball halves lodged in cavities in said mold sections, and said mold sections having been closed to a position in which the adhesive coatings on the edges of said ball halves are near to but not engaging each other and in which the outer peripheries of said mold sections are in sealing engagement with one another, comprising the steps of withdrawing air through a port in said chamber until the pressure in the chamber is reduced to 15 to 35 kPa absolute, introducing said mixture of gases into said chamber through a port wherein said second gas has a permeability through the ball wall of from 1% to 90% to that of air and is present at a level of from 10 to 92 mole percent of the total of the gas mixture.

2. The method of claim 1 wherein the second gas has a permeability through the ball wall of from 1 to 50% of that of air.

3. The method according to claim 1 wherein said second gas is selected from the class consisting of sulfur hexafluoride ($SF_6$), perfluoromethane ($CF_4$), perfluoroethane ($C_2F_6$), perfluoropropane ($C_3F_8$), chloropentafluoroethane ($C_2ClF_5$), and perfluorocyclobutane ($C_4F_8$).

4. The method according to claim 1 wherein said pressure in said chamber is reduced to 15 to 25 kPa.

5. The method according to claim 4 wherein said second gas is sulfur hexafluoride.

* * * * *